J. W. Doty.
Harvester Pitman.
No. 4,017. Reissued Jun. 7, 1870.
Fig. 4.
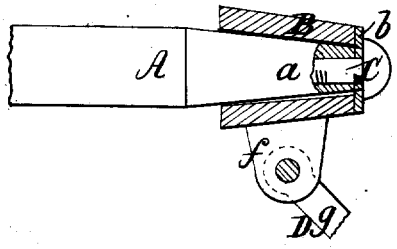
Fig. 1
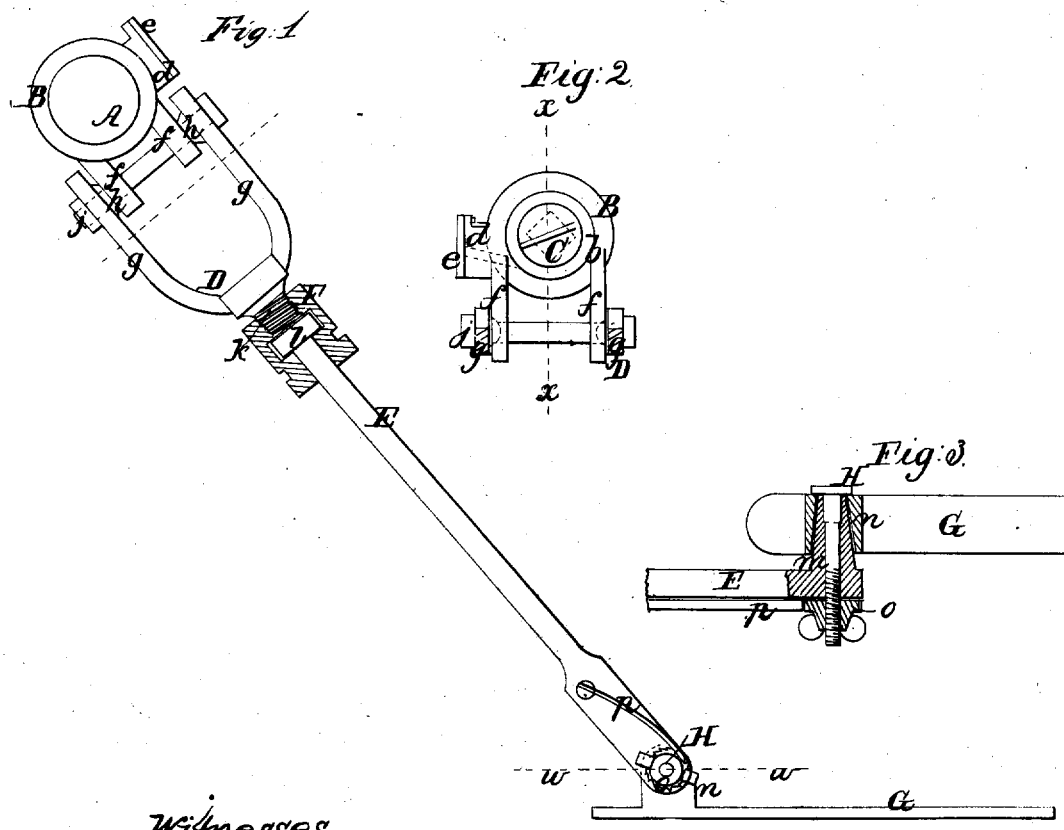
Fig. 2.
Fig. 3.
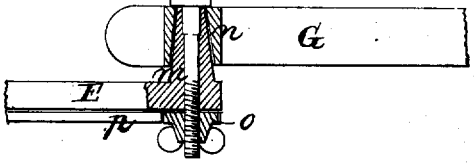
Witnesses
Thos. Tusch
J. A. Lurvie
Inventor
J. W. Doty
Per Munn & Co
Attorneys
N. PETERS, PHOTO-LITHOGRAPHER, WASHINGTON, D. C.

United States Patent Office.

J. W. DOTY, OF LOCKPORT, NEW YORK.

*Letters Patent No.* 59,192, *dated October* 30, 1866; *reissue No.* 4,017, *dated June* 7, 1870.

DIVISION B.

IMPROVEMENT IN PITMAN-CONNECTION FOR HARVESTERS.

The Schedule referred to in these Letters Patent and making part of the same.

*To all whom it may concern:*

Be it known that I, J. W. DOTY, of Lockport, in the county of Niagara and State of New York, have invented a new and useful Improvement in Pitmen for Harvesters, &c.; and I do hereby declare the following to be a full, clear, and exact description of the same, reference being had to the accompanying drawing, in which—

Figure 1 is a side view of my invention, partly in section.

Figure 2 is an end view of the wrist-pin and box.

Figure 3 is a horizontal section through the sickle-joint, on line *w w*, fig. 1.

Figure 4 is a section of the wrist-pin and box, taken in line *x x*, fig. 2.

This invention relates to a new and useful improvement in pitmen for driving the sickles of grain and grass-harvesters; and Its object is to obviate the wear and tear, the jars, and concussions produced by unnecessary play at the points of connection, as well as to obviate the undue friction and breakage caused by the pitman getting out of line with the wrist-pin and cutter-bar.

A represents a wrist-pin, which may be of steel or chilled cast-iron, made separately and fitted to the fly-wheel in any proper manner.

The outer part, *a*, is of taper, conical, or spherical form, to receive a box, B, having a conical interior, to correspond to the conical part *a* of the wrist-pin.

The box B is secured on the wrist-pin by means of a screw, C, and a washer, *b*, the latter being fitted on an angular portion of the end of the wrist-pin, and the washer retained in place by the head of the screw, the body of the latter being screwed into the end of the wrist-pin.

By this arrangement it will be seen that the box B may always be made to fit snugly on the wrist-pin, wear being compensated for by screwing up the screw C.

The box B is cast with a hollow lateral projection, *d*, to form an oil-passage or chamber, which may have a sponge or any absorbent material fitted within it and saturated with oil, a cover, *e*, being fitted to the outer end of *d*, to prevent the escape of the lubricating sponge.

By this means the wrist-pin may always be kept in proper lubricated state.

The box B is also cast with the pendent ears or lugs *f f*, to which the head D of the pitman E is attached as follows:

The pitman-head is composed of two prongs, *g g*, the inner surfaces of the outer end of which are provided with hemispherical projections *h h*, which fit in corresponding cavities in the outer sides of the ears or lugs *f f*, and a screw-bolt, *j*, passing through the ears or lugs, and the projections *h h* of the prongs *g g* of the head D, as seen in fig. 2.

The upper end of the pitman E is provided with a head, *l*, and collar F, in the chamber or recess of which the head *l* has its seat.

The collar F screws upon the tang K, which projects from the head D, so that, while the pitman E is firmly attached to the head D, it still has a free movement on its own axis without affecting the position of the head D in a similar way, because the head *l* and collar F form a swivel-connection with said head.

The lower end of the pitman E is provided with a conical or spherical wrist-pin, *m*, which projects sidewise and at right angles from said pitman, as shown in fig. 3.

This wrist-pin is seated in a socket of corresponding shape, made in the head *n* of the cutter-bar G, thus forming a conical or spherical joint, which may always be maintained in snug working condition by keeping the parts in close and proper contact, and all rattling or lost motion in the joint be obviated.

The headed screw-bolt H is employed for the purpose of retaining the parts of the joint in position, and to draw them closer together from time to time, to compensate for the wearing away of the frictional surfaces.

The bolt H is provided with a head at one end, which rests upon the outer side of one of the parts which form the joint, and at its other end is a screw-nut, O, which rests upon the outer side of the other part of the joint, so that both the pitman and cutter-bar are between the head and nut of said bolt, and may be drawn closer together by turning said nut.

The bolt H passes through the projection *m* in the direction of its axis, and its action is uniform upon those parts of the joint which surround the axis, and tends to prevent the unequal wear which would result if the binding pressure should be at one side of said axis, so as to produce more friction upon one part of the joint than upon another.

That part of the screw H which is nearest the head thereof is made with plain sides and angles, and the socket or hole through which the bolt passes is made of corresponding shape at the part intended to receive the angular portion of the bolt. This form is given to the screw-bolt to prevent any rotation on its own axis within its socket, either when the nut O is being tightened up or at any other time.

The violent movement of the cutting apparatus in its reciprocations is sufficient to loosen any fastening which depends upon frictional contact to keep it in place, and I have therefore made a ratchet on the edge of the nut O, and provided a pawl to engage with said ratchet, so that said nut cannot be turned backward by any jarring or other mechanical effects originating in the movements of the machine, and, for convenience, I make the pawl as shown at *p*, figs. 1 and 3, of such form and length as will enable it to act as a spring, to prevent any accidental disengagement of the pawl from the ratchet on the nut.

When it may be necessary to separate the pitman E and cutter-bar G, it may be accomplished with facility by disengaging the pawl from the ratchet, and then turning the nut backward until it is removed from the bolt, when all the parts may be separated.

Having described my invention,

What I claim in this patent as new, is—

The combination of the forked or pronged pitman-head D, secured to the ears or lugs *f f* by a screw-bolt, *j*, taper, conical, or spherical wrist-pin A, and box B, the whole arranged substantially in the manner and for the purpose set forth.

J. W. DOTY.

Witnesses:
E. A. HOLT,
JAS. ATWATER.